(12) United States Patent
Yamamoto

(10) Patent No.: US 11,180,190 B2
(45) Date of Patent: Nov. 23, 2021

(54) FOUR-WHEEL STEERING SYSTEM

(71) Applicant: JTEKT CORPORATION, Osaka (JP)

(72) Inventor: Yasuharu Yamamoto, Toyota (JP)

(73) Assignee: JTEKT CORPORATION, Osaka (JP)

( * ) Notice: Subject to any disclaimer, the term of this patent is extended or adjusted under 35 U.S.C. 154(b) by 371 days.

(21) Appl. No.: 16/375,995

(22) Filed: Apr. 5, 2019

(65) Prior Publication Data

US 2019/0315396 A1     Oct. 17, 2019

(30) Foreign Application Priority Data

Apr. 11, 2018 (JP) .............................. JP2018-076131

(51) Int. Cl.
| | |
|---|---|
| *B62D 6/00* | (2006.01) |
| *B62D 7/12* | (2006.01) |
| *B62D 7/15* | (2006.01) |
| *B62D 15/02* | (2006.01) |

(52) U.S. Cl.
CPC ............... *B62D 6/002* (2013.01); *B62D 7/12* (2013.01); *B62D 7/15* (2013.01); *B62D 15/022* (2013.01)

(58) Field of Classification Search
CPC .......... B62D 6/002; B62D 7/15; B62D 7/159; B62D 7/1581
See application file for complete search history.

(56) References Cited

U.S. PATENT DOCUMENTS

| | | | | | |
|---|---|---|---|---|---|
| 4,700,960 | A | * | 10/1987 | Miki ...................... | B62D 7/159 180/414 |
| 5,386,365 | A | * | 1/1995 | Nagaoka ................ | B62D 7/159 701/44 |
| 5,627,754 | A | * | 5/1997 | Asanuma ............... | B62D 7/159 180/408 |

(Continued)

FOREIGN PATENT DOCUMENTS

| | | |
|---|---|---|
| DE | 195 02 073 A1 | 7/1996 |
| EP | 2 594 458 A2 | 5/2013 |

(Continued)

OTHER PUBLICATIONS

Hirotaka Kanazawa, To provide a 4 wheel steering device of the vehicle, May 1984, JPO, JP 59-077970 A, Machine Translation of Description (Year: 1984).*

(Continued)

*Primary Examiner* — James A English
(74) *Attorney, Agent, or Firm* — Oliff PLC

(57) ABSTRACT

The four-wheel steering system includes a rear-wheel steering system that steers rear wheels of the vehicle in accordance with a steering angle of a steering wheel. When the vehicle speed is lower than a vehicle speed threshold, the rear-wheel steering system steers the rear wheels in an opposite direction to that in which the front wheels are steered. When the vehicle speed is lower than the vehicle speed threshold, the rear-wheel steering system sharply increases the rate of increase in target steered angle of the rear wheels with respect to an increase in steering angle (Continued)

when an absolute value of the steering angle is equal to or larger than an absolute value of an angle threshold. The front-wheel steering system has a motor that is a source of a steering assist force and a first ECU that controls the motor in accordance with the steering state.

5 Claims, 9 Drawing Sheets

(56) References Cited

U.S. PATENT DOCUMENTS

| | | | |
|---|---|---|---|
| 8,165,755 B2* | 4/2012 | Garcia Estebanez .. | B62D 7/159 701/42 |
| 2010/0126795 A1* | 5/2010 | Tokunaga .............. | B62D 6/008 180/446 |
| 2010/0332083 A1* | 12/2010 | Yanagi .................. | B62D 7/159 701/42 |
| 2013/0131927 A1 | 5/2013 | Ishihara | |
| 2014/0081524 A1* | 3/2014 | Tamaizumi ............ | B62D 7/159 701/42 |
| 2019/0176879 A1* | 6/2019 | Bergmann .............. | B62D 6/00 |
| 2019/0315399 A1* | 10/2019 | Yamamoto ........... | B62D 7/1509 |
| 2020/0377150 A1* | 12/2020 | Hidaka ................. | B62D 5/0481 |

FOREIGN PATENT DOCUMENTS

| | | | | |
|---|---|---|---|---|
| JP | 59077970 A | * | 5/1984 | ........... B62D 7/1545 |
| JP | H02-254061 A | | 10/1990 | |
| JP | 2008-074192 A | | 4/2008 | |
| JP | 2014-213775 A | | 11/2014 | |

OTHER PUBLICATIONS

Hirotaka Kanazawa, To provide a 4 wheel steering device of the vehicle, May 1992, JPO, JP 04-040229 B, Machine Translation of Description (Year: 1992).*
Sep. 6, 2019 Extended European Search Report issued in European Patent Application No. 19168458.8.

* cited by examiner

GRAPH A

GRAPH B

GRAPH C

GRAPH A

GRAPH B

GRAPH C

FOUR-WHEEL STEERING SYSTEM

The disclosure of Japanese Patent Application No. 2018-076131 filed on Apr. 11, 2018 including the specification, drawings and abstract, is incorporated herein by reference in its entirety.

BACKGROUND OF THE INVENTION

1. Field of the Invention

The invention relates to four-wheel steering systems.

2. Description of the Related Art

As described in, e.g., Japanese Patent Application Publication No. 2014-213775 (JP 2014-213775 A), four-wheel steering systems that steer not only front wheels but also rear wheels of a vehicle in accordance with operation of a steering wheel are conventionally known in the art. When the vehicle moves at low speeds, the four-wheel steering system steers the rear wheels in the opposite direction to that in which the front wheels are steered in accordance with the steering angle of the steering wheel. This allows the driver to turn the vehicle with a smaller turning radius when, e.g., maneuvering the vehicle in a parking lot.

For example, steering characteristics of the rear wheels with respect to the steering angle can be set so that the steered angle of the rear wheels increases in proportion to an increase in steering angle. The driver need only turn the steering wheel more when he or she wants to turn the vehicle with a smaller turning radius. However, the driver may not always be able to turn the vehicle as desired depending on the situations where the vehicle travels or the situations where the driver drives the vehicle, such as when parking in a garage or when driving on a narrow road bent like a crank or a U-turn road.

SUMMARY OF THE INVENTION

It is one object of the invention to provide a four-wheel steering system capable of providing better maneuverability with a small turning radius.

According to one aspect of the invention, a four-wheel steering system includes: a front-wheel steering system that steers front wheels of a vehicle; and a rear-wheel steering system that steers rear wheels of the vehicle in accordance with a steering angle that is a rotation angle of a steering wheel. When a vehicle speed is lower than a vehicle speed threshold, the rear-wheel steering system steers the rear wheels in an opposite direction to that in which the front wheels are steered. When the vehicle speed is lower than the vehicle speed threshold, the rear-wheel steering system sharply increases a rate of increase in steered angle of the rear wheels with respect to an increase in steering angle when an absolute value of the steering angle is equal to or larger than an absolute value of an angle threshold.

With this configuration, when the vehicle speed is lower than the vehicle speed threshold, a turning radius of the vehicle sharply decreases with an increase in steering angle when the steering angle is equal to or larger than the angle threshold. The vehicle thus has better maneuverability with a small turning radius.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
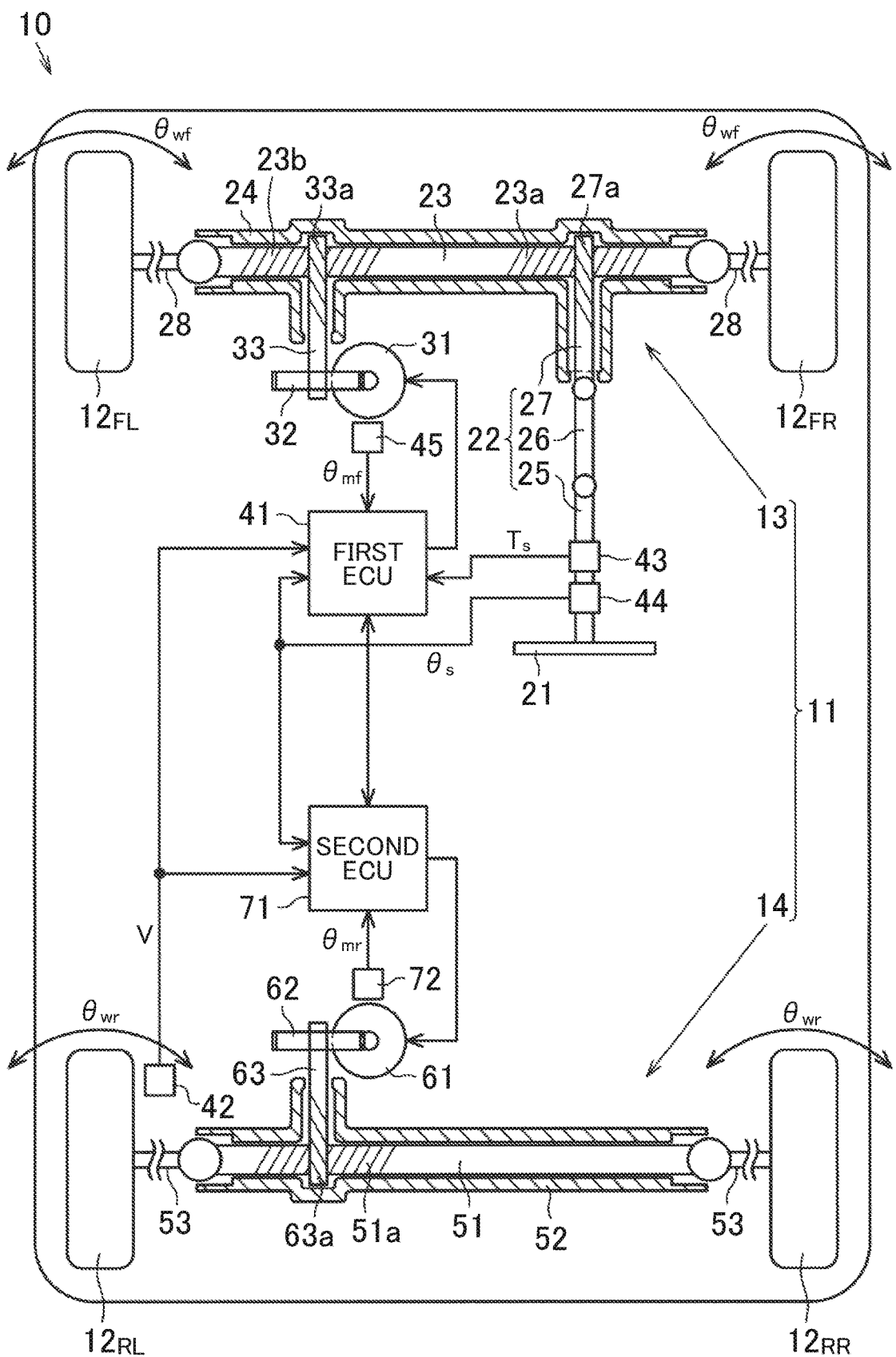
FIG. 1 is a schematic configuration diagram of a first embodiment of a four-wheel steering system that is mounted on a vehicle.

A first embodiment of a four-wheel steering system of the invention will be described below. As shown in FIG. 1, a vehicle 10 is equipped with a four-wheel steering system 11. The four-wheel steering system 11 has a front-wheel steering system 13 that steers front wheels $12_{FR}$, $12_{FL}$ and a rear-wheel steering system 14 that steers rear wheels $12_{RR}$, $12_{RL}$.

The front-wheel steering system 13 has a steering shaft 22 to which a steering wheel 21 is connected, a steered shaft 23 extending in the lateral direction of the vehicle 10 (the horizontal direction in FIG. 1), and a housing 24 accommodating the steered shaft 23 so that the steered shaft 23 can reciprocate therein. The steering shaft 22 is formed by a column shaft 25, an intermediate shaft 26, and a pinion shaft 27 which are connected together in this order from the steering wheel 21 side. The pinion shaft 27 crosses the steered shaft 23. Pinion teeth 27a of the pinion shaft 27 mesh with rack teeth 23a of the steered shaft 23. The right and left front wheels $12_{FR}$, $12_{FL}$ are connected to respective ends of the steered shaft 23 via tie rods 28 and knuckles, not shown. As the steering wheel 21 is turned, the steered shaft 23 moves linearly, whereby the steered angle $\theta_{wf}$ of the front wheels $12_{FR}$, $12_{FL}$ is changed.

The front-wheel steering system 13 has a motor 31, a reduction gear mechanism 32, and a pinion shaft 33 as a configuration that assists the driver in operating the steering wheel 21. The motor 31 is a source of a steering assist force (assist force). A three-phase brushless motor is used as the motor 31. A rotary shaft of the motor 31 is coupled to the pinion shaft 33 via the reduction gear mechanism 32. Pinion teeth 33a of the pinion shaft 33 mesh with rack teeth 23b of the steered shaft 23. Torque of the motor 31 is applied as a steering assist force to the steered shaft 23 via the pinion shaft 33. The steered shaft 23 moves in the lateral direction of the vehicle 10 in accordance with rotation of the motor 31.

The front-wheel steering system 13 has a first electronic control unit (ECU) 41. The first ECU 41 controls the motor 31 based on the detection results of various sensors mounted on the vehicle 10. The sensors include a vehicle speed sensor 42, a torque sensor 43, a steering angle sensor 44, and a rotation angle sensor 45. The vehicle speed sensor 42 detects the vehicle speed V. The torque sensor 43 is mounted on the column shaft 25. The torque sensor 43 detects steering torque $T_s$ applied to the steering shaft 22 via the steering wheel 21. The steering angle sensor 44 is mounted between the steering wheel 21 and the torque sensor 43 on the column shaft 25. The steering angle sensor 44 detects the steering angle $\theta_s$, that is a rotation angle of the steering shaft 22. The rotation angle sensor 45 is mounted on the motor 31. The rotation angle sensor 45 detects the rotation angle $\theta_{mf}$ of the motor 31. The first ECU 41 controls the motor 31 based on the vehicle speed V, the steering torque $T_s$ the steering angle $\theta_s$ and the rotation angle $\theta_{mf}$ of the motor 31 which are detected by these sensors.

The rear-wheel steering system 14 has a steered shaft 51 extending in the lateral direction of the vehicle 10 (the horizontal direction in FIG. 1) and a housing 52 accommodating the steered shaft 51 so that the steered shaft 51 can reciprocate therein. The right and left rear wheels $12_{RR}$, $12_{RL}$ are connected to respective ends of the steered shaft 51 via tie rods 53 and knuckles, not shown. The rear-wheel steering system 14 has a motor 61, a reduction gear mechanism 62, and a pinion shaft 63 as a configuration that applies a steering force, namely power for steering the rear wheels $12_{RR}$, $12_{RL}$, to the steered shaft 51. The motor 61 is a source of the steering force. A three-phase brushless motor is used as the motor 61. A rotary shaft of the motor 61 is coupled to the pinion shaft 63 via the reduction gear mechanism 62. Pinion teeth 63a of the pinion shaft 63 mesh with rack teeth 51a of the steered shaft 51. Torque of the motor 61 is applied as a steering force to the steered shaft 51 via the pinion shaft 63. The steered shaft 51 thus moves linearly in the lateral direction of the vehicle 10 with rotation of the motor 61, whereby the steered angle $\theta_{wr}$ of the rear wheels $12_{RR}$, $12_{RL}$ is changed.

The rear-wheel steering system 14 has a second ECU 71. The second ECU 71 controls the motor 61 based on the vehicle speed V, the steering angle $\theta_s$, and the rotation angle $\theta_{mr}$ of the motor 61. The rotation angle $\theta_{mr}$ of the motor 61 is detected by a rotation angle sensor 72 mounted on the motor 61.

Figure 2:
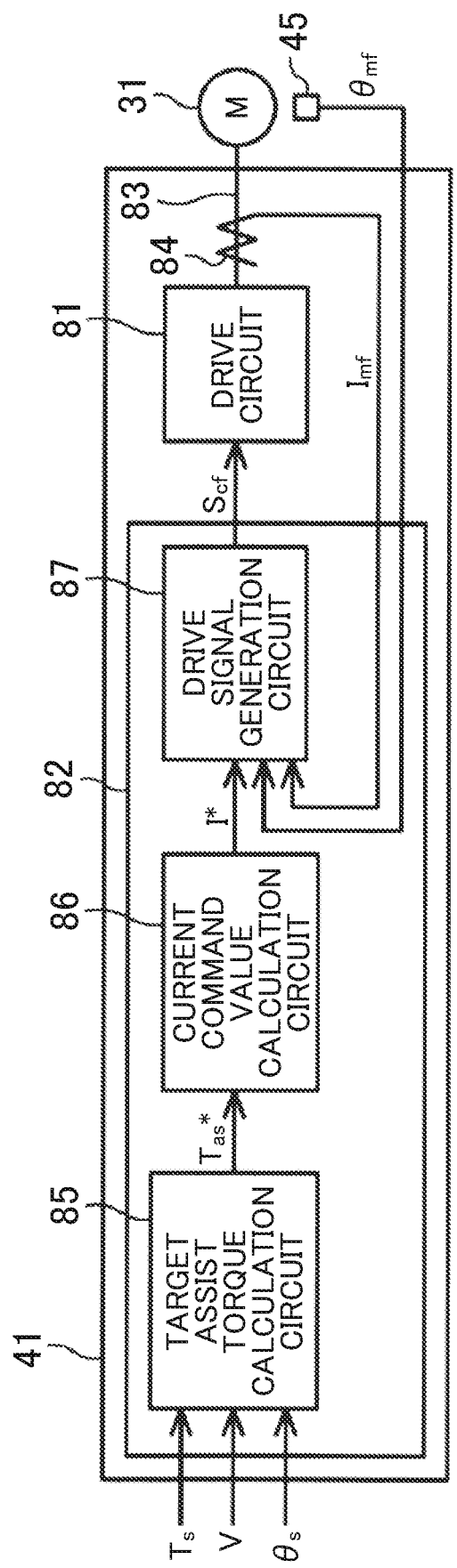
FIG. 2 is a control block diagram of a first ECU of the first embodiment.

Next, the first ECU 41 will be described in detail. As shown in FIG. 2, the first ECU 41 includes a drive circuit 81 and a microcomputer 82.

For example, a pulse width modulation (PWM)-controlled inverter circuit is used as the drive circuit 81. The drive circuit 81 converts a direct current supplied from an on-board DC power supply such as a battery to a three-phase alternating current, based on a drive signal (PWM signal) $S_{cf}$ generated by the microcomputer 82. This three-phase alternating current is supplied to the motor 31 through a power supply path 83. A current sensor 84 is disposed on the power supply path 83. The current sensor 84 detects an actual current value $I_{mf}$ on the power supply path 83.

The microcomputer 82 has various arithmetic circuits that are implemented by executing a control program stored in a storage device, not shown, of the first ECU 41. The microcomputer 82 includes, as the arithmetic circuits, a target assist torque calculation circuit 85, a current command value calculation circuit 86, and a drive signal generation circuit 87.

The target assist torque calculation circuit 85 calculates target assist torque $T_{as}^*$ based on the steering torque $T_s$ and the vehicle speed V. The target assist torque $T_{as}^*$ is a target value of a rotational force (torque) to be generated by the motor 31. The target assist torque calculation circuit 85 sets the absolute value of the target assist torque $T_{as}^*$ to a larger value as the absolute value of the steering torque $T_s$ increases and the vehicle speed V decreases.

The current command value calculation circuit 86 calculates a current command value I* based on the target assist torque $T_{as}^*$ calculated by the target assist torque calculation circuit 85. For example, the current command value calculation circuit 86 calculates the current command value I* by dividing the target assist torque $T_{as}^*$ by a torque constant of the motor 31. The current command value I* is a target value of a current to be supplied to the motor 31 in order to cause the motor 31 to generate the target assist torque $T_{as}^*$.

The drive signal generation circuit 87 performs current feedback control in accordance with the rotation angle $\theta_{mf}$ of the motor 31 so that the actual current value $I_{mf}$ that is supplied to the motor 31 follows the current command value I*. The drive signal generation circuit 87 calculates the deviation between the current command value I* and the actual current value $I_{mf}$ and generates a drive signal $S_{cf}$ for the drive circuit 81 so as to eliminate the deviation. A current in accordance with the drive signal $S_{cf}$ is supplied to the motor 31 through the drive circuit 81, whereby the motor 31 generates a rotational force in accordance with the target assist torque $T_{as}^*$.

Figure 3:
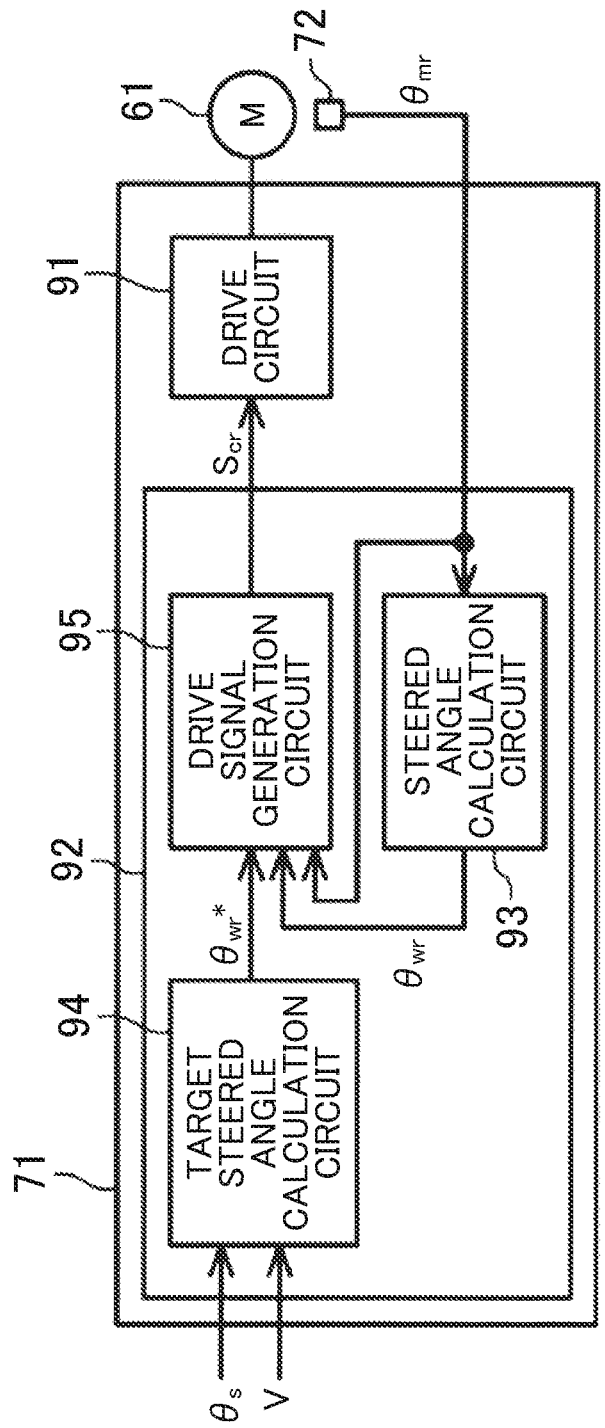
FIG. 3 is a control block diagram of a second ECU of the first embodiment.

The second ECU 71 will be described in detail. As shown in FIG. 3, the second ECU 71 includes a drive circuit 91 and a microcomputer 92.

A PWM-controlled inverter circuit is used also as the drive circuit 91. The drive circuit 91 converts a direct current supplied from an on-board DC power supply such as a battery to a three-phase alternating current, based on a drive signal (PWM signal) $S_{cr}$ generated by the microcomputer 92.

The microcomputer 92 has various arithmetic circuits that are implemented by executing a control program stored in a storage device, not shown, of the second ECU 71. The microcomputer 92 includes, as the arithmetic circuits, a steered angle calculation circuit 93, a target steered angle calculation circuit 94, and a drive signal generation circuit 95.

The steered angle calculation circuit 93 calculates an actual steered angle $\theta_{wr}$ of the rear wheels $12_{RR}$, $12_{RL}$ based on the rotation angle $\theta_{mr}$ of the motor 61 which is detected by the rotation angle sensor 72. The motor 61 is coupled to the pinion shaft 63 via the reduction gear mechanism 62. The pinion teeth 63a of the pinion shaft 63 mesh with the rack teeth 51a of the steered shaft 51. Accordingly, there is a correlation between the rotation angle $\theta_{mr}$ of the motor 61 and the rotation angle of the pinion shaft 63 and thus between the rotation angle $\theta_{mr}$ of the motor 61 and the displacement of the steered shaft 51. The steered angle calculation circuit 93 can calculate the steered angle $\theta_{wr}$ of the rear wheels $12_{RR}$, $12_{RL}$ from the rotation angle $\theta_{mr}$ of the motor 61 by using this correlation.

The target steered angle calculation circuit 94 calculates a target steered angle $\theta_{wr}*$ of the rear wheels $12_{RR}$, $12_{RL}$ based on the steering angle $\theta_s$ and the vehicle speed V. The target steered angle calculation circuit 94 calculates the target steered angle $\theta_{wr}*$ of the rear wheels $12_{RR}$, $12_{RL}$ by using steering characteristics maps that define the relationship between the steering angle $\theta_s$ and the target steered angle $\theta_{wr}*$. The target steered angle calculation circuit 94 uses the steering characteristics maps with different characteristics between the case where the vehicle speed V is in a low speed range lower than a vehicle speed threshold (e.g., 30 km/h) and the case where the vehicle speed V is in a medium to high speed range equal to or higher than the vehicle speed threshold. The steering characteristics maps are stored in the storage device of the second ECU 71.

Figure 4A:
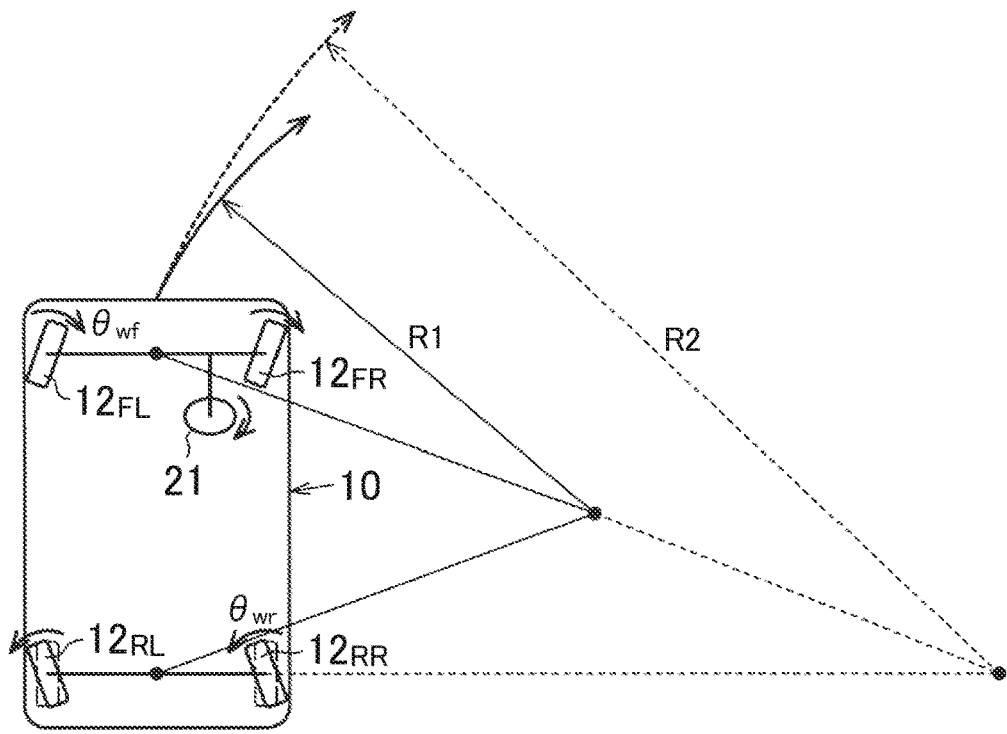
FIG. 4A is a plan view of a vehicle showing the phase relationship (antiphase) between front and rear wheels in the first embodiment.

When the vehicle speed V is in the low speed range lower than the vehicle speed threshold, the target steered angle calculation circuit 94 calculates the target steered angle $\theta_{wr}*$ of the rear wheels $12_{RR}$, $12_{RL}$ so that the rear wheels $12_{RR}$, $12_{RL}$ are steered in the opposite direction (antiphase) to that in which the front wheels $12_{FR}$, $12_{FL}$ are steered. As shown in FIG. 4A, since the steered angle $\theta_{wr}$ of the rear wheels $12_{RR}$, $12_{RL}$ is in antiphase with the steered angle $\theta_{wf}$ of the front wheels $12_{FR}$, $12_{FL}$, the overall turning radius R1 of the vehicle 10 is smaller than the turning radius R2 in the case where the vehicle 10 is a two-wheel steering vehicle (in the case where the direction in which the rear wheels $12_{RR}$, $12_{RL}$ are steered is kept in such a direction that the vehicle 10 moves straight). The vehicle 10 therefore has improved maneuverability with a small turning radius.

Figure 4B:
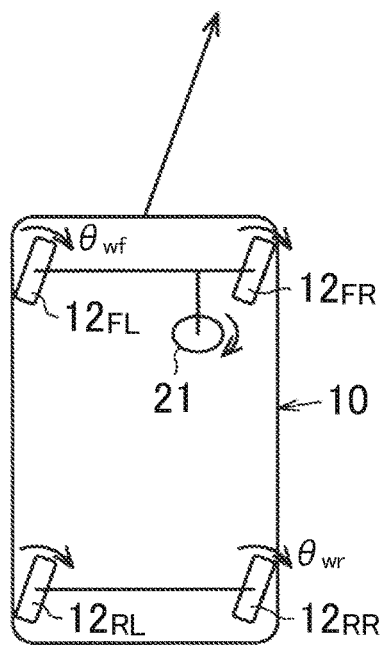
FIG. 4B is a plan view of a vehicle showing the phase relationship (in phase) between front and rear wheels in the first embodiment.

When the vehicle speed V is in the medium to high speed range equal to or higher than the vehicle speed threshold, the target steered angle calculation circuit 94 calculates the target steering angle $\theta_{wr}*$ of the rear wheels $12_{RR}$, $12_{RL}$ so that the rear wheels $12_{RR}$, $12_{RL}$ are steered in the same direction (in phase) as that in which the front wheels $12_{FR}$, $12_{FL}$ are steered. Since the steered angle $\theta_{wr}$ of the rear wheels $12_{RR}$, $12_{RL}$ is in phase with the steered angle $\theta_{wf}$ of the front wheels $12_{FR}$, $12_{FL}$ as shown in FIG. 4B, this provides driving stability when making lane changes or turning corners. In the case where the steered angle $\theta_{wr}$ of the rear wheels $12_{RR}$, $12_{RL}$ is set to the same angle as the steered angle $\theta_{wf}$ of the front wheels $12_{FR}$, $12_{FL}$, this allows the vehicle 10 to move obliquely, parallel to the direction in which the rear wheels $12_{RR}$, $12_{RL}$ and the front wheels $12_{FR}$, $12_{FL}$ are steered.

The drive signal generation circuit 95 performs feedback control of the steered angle $\theta_{wr}$ in accordance with the rotation angle $\theta_{mr}$ of the motor 31 so that the actual steered angle $\theta_{wr}$ of the rear wheels $12_{RR}$, $12_{RL}$ follows the target steered angle $\theta_{wr}*$. The drive signal generation circuit 95 calculates the deviation between the target steered angle $\theta_{wr}*$ and the actual steered angle $\theta_{wr}$ and generates a drive signal $S_{cr}$ for the drive circuit 91 so as to eliminate the deviation. A current in accordance with the drive signal $S_{cr}$ is supplied to the motor 61 through the drive circuit 91, whereby the motor 61 operates so as to eliminate the deviation between the target steered angle $\theta_{wr}*$ and the actual steered angle $\theta_{wr}$.

The steering characteristics map that is used by the target steered angle calculation circuit 94 when the vehicle speed V is in the low speed range will be described.

In this example, the steering angle $\theta_s$ is processed as a positive value in the case where the steering wheel 21 has been turned to the left with respect to its neutral position and is processed as a negative value in the case where the steering wheel 21 has been turned to the right with respect to its neutral position. The steering torque $T_s$ detected by the torque sensor 43 is processed as a positive value in the case where the steering wheel 21 has been turned to the left with respect to its neutral position and is processed as a negative value in the case where the steering wheel 21 has been turned to the right with respect to its neutral position.

Figure 5:
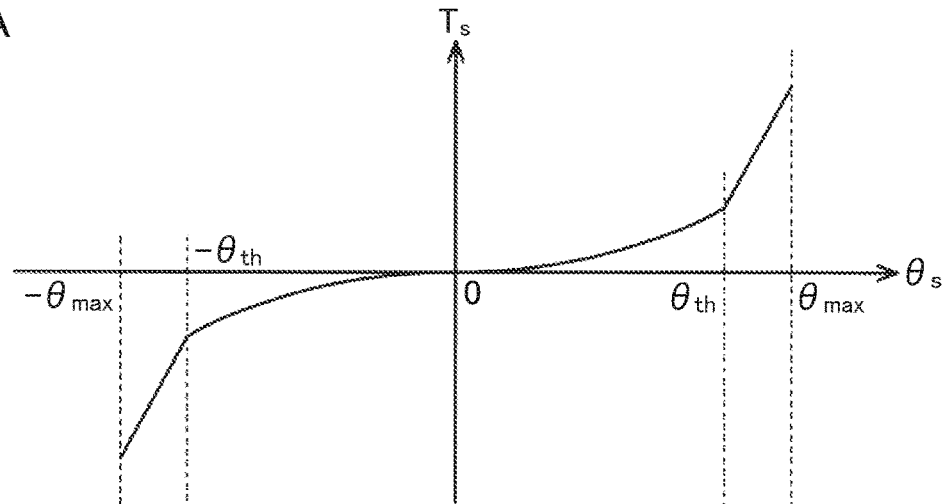
FIG. 5 shows graphs A to C, where graph A shows the relationship between the steering angle and the steering torque in the first embodiment, graph B shows the relationship between the steering angle and the target steered angle of the rear wheels in the first embodiment, and graph C shows the relationship between the steering angle and the turning radius of a vehicle in the first embodiment.
Figure 5:
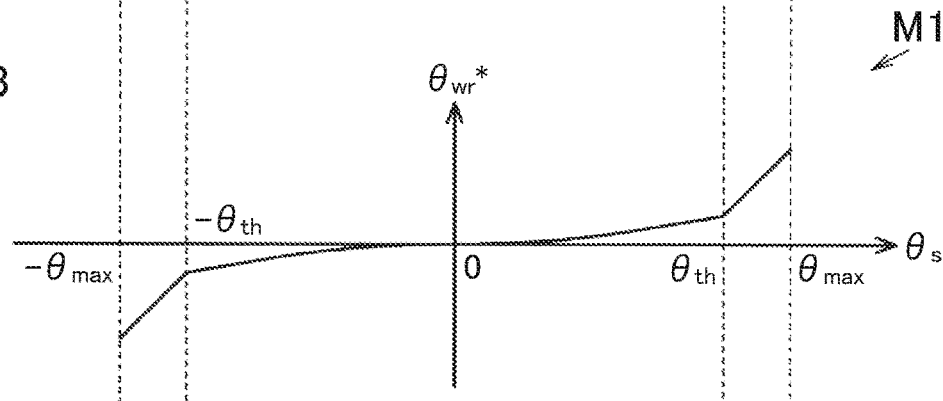
Figure 5:
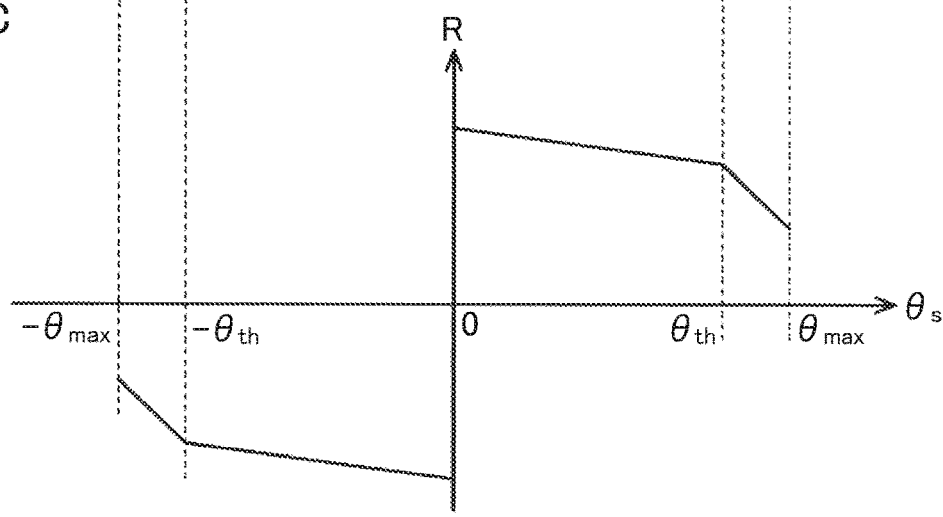

As shown in graph B of FIG. 5, a steering characteristics map M1 is a map with the abscissa representing the steering angle $\theta_s$ and the ordinate representing the target steered angle $\theta_{wr}*$ of the rear wheels $12_{RR}$, $12_{RL}$ and defines the relationship between the steering angle $\theta_s$ and the target steered angle $\theta_{wr}*$. The steering characteristics map M1 has the following characteristics.

When the steering angle $\theta_s$ is 0 (zero) that corresponds to the state where the vehicle 10 is moving straight (the steering wheel 21 is located at its neutral position), the target steered angle $\theta_{wr}*$ is 0 (zero). When the absolute value of the steering angle $\theta_s$ is smaller than the absolute value of angle thresholds $\theta_{th}$, $-\theta_{th}$, the absolute value of the target steered angle $\theta_{wr}*$ gradually increases linearly with an increase in absolute value of the steering angle $\theta_s$. When the absolute value of the steering angle $\theta_s$ is equal to or larger than the absolute value of the angle thresholds $\theta_{th}$, $-\theta_{th}$, the absolute value of the target steered angle $\theta_{wr}*$ sharply increases linearly with respect to an increase in absolute value of the steering angle $\theta_s$. That is, the rate of increase in absolute value of the target steered angle $\theta_{wr}*$ with respect to an increase in absolute value of the steering angel $\theta_s$ (the slope of the characteristics line) is higher (steeper) when the absolute value of the steering angle $\theta_s$ is equal to or larger than the absolute value of the angle thresholds $\theta_{th}$, $-\theta_{th}$ than when the absolute value of the steering angle $\theta_s$ is smaller than the absolute value of the angle thresholds $\theta_{th}$, $-\theta_{th}$. In other words, the gradient of increase in absolute value of the target steered angle $\theta_{wr}*$ with respect to an increase in absolute value of the steering angle $\theta_s$ is steeper when the absolute value of the steering angle $\theta_s$ is equal to or larger than the absolute value of the angle thresholds $\theta_{th}$, $-\theta_{th}$ than when the absolute value of the steering angle $\theta_s$ is smaller than the absolute value of the angle thresholds $\theta_{th}$, $-\theta_{th}$.

The positive and negative angle thresholds $\theta_{th}$, $-\theta_{th}$ are set to values near limit steering angles $\theta_{max}$, $-\theta_{max}$ at which the steering wheel 21 reaches a limit position in its physical operation range. However, the absolute value of the angle thresholds $\theta_{th}$, $-\theta_{th}$ is smaller than the absolute value of the limit steering angles $\theta_{max}$, $-\theta_{max}$. For example, the limit steering angles $\theta_{max}$, $-\theta_{max}$ of the steering wheel 21 are determined by either the upper limit of the steering angle $\theta_s$ which is determined by the length of a spiral cable disposed in the steering wheel 21 or the steering angle $\theta_s$ at which the steered shaft 23 reaches a limit position in its physical movable range (the position where an end of the steered shaft 23 contacts the housing 24).

By setting the target steered angle $\theta_{wr}*$ of the rear wheels $12_{RR}$, $12_{RL}$ in accordance with the steering characteristics map M1, the turning radius of the vehicle 10 changes with a change in steering angle $\theta_s$ in the following manner. As shown in graph C of FIG. 5, when the absolute value of the steering angle $\theta_s$ is smaller than the absolute value of the angle thresholds $\theta_{th}$, $-\theta_{th}$, the absolute value of the turning radius R gradually decreases with respect to an increase in absolute value of the steering angle $\theta_s$. When the absolute value of the steering angle $\theta_s$ is equal to or larger than the absolute value of the angle thresholds $\theta_{th}$, $-\theta_{th}$, the absolute value of the turning radius R sharply decreases with an increase in steering angle $\theta_s$. That is, the rate of decrease in absolute value of the turning radius R with respect to an increase in absolute value of the steering angle $\theta_s$ (the slope of the characteristics line) is higher (steeper) when the absolute value of the steering angle $\theta_s$ is equal to or larger than the absolute value of the angle thresholds $\theta_{th}$, $-\theta_{th}$ than when the absolute value of the steering angle $\theta_s$ is smaller than the absolute value of the angle thresholds $\theta_{th}$, $-\theta_{th}$. In other words, the gradient of decrease in absolute value of the turning radius R with respect to an increase in absolute value of the steering angle $\theta_s$ is steeper when the absolute value of the steering angle $\theta_s$ is equal to or larger than the absolute value of the angle thresholds $\theta_{th}$, $-\theta_{th}$ than when the absolute value of the steering angle $\theta_s$ is smaller than the absolute value of the angle thresholds $\theta_{th}$, $-\theta_{th}$.

The larger the absolute value of the steering angle $\theta_s$ is, the stronger the driver's intention to turn the vehicle 10 with a smaller turning radius is. Especially when the absolute value of the steering angle $\theta_s$ is larger than the absolute value of the angle thresholds $\theta_{th}$, $-\theta_{th}$ that are near the limit steering angles $\theta_{max}$, $-\theta_{max}$, it is assumed that the driver is trying to make a sharp turn. In the present embodiment, when the absolute value of the steering angle $\theta_s$ is equal to or larger than the absolute value of the angle thresholds $\theta_{th}$, $-\theta_{th}$, the rate of increase in absolute value of the target steered angle $\theta_{wr}*$ of the rear wheels $12_{RR}$, $12_{RL}$ with respect to an increase in absolute value of the steering angel $\theta_s$ is increased sharply, so that the absolute value of the turning radius R of the vehicle 10 sharply decreases with respect to an increase in absolute value of the steering angle $\theta_s$.

That is, since the vehicle 10's maneuverability with a small turning radius is rapidly improved, the vehicle 10 can easily respond to the driver's intention to make a sharp turn. Since the absolute value of the target steered angle $\theta_{wr}*$ of the rear wheels $12_{RR}$, $12_{RL}$ is increased sharply with respect to an increase in absolute value of the steering angle $\theta_s$, this facilitates driver's maneuver to turn the vehicle 10. The vehicle 10 can thus respond to the driver's request to turn the vehicle 10 with as small a turning radius as possible.

However, when the absolute value of the steering angle $\theta_s$ is equal to or larger than the absolute value of the angle thresholds $\theta_{th}$, $-\theta_{th}$, the absolute value of the turning radius R of the vehicle 10 sharply decreases with respect to an increase in absolute value of the steering angle $\theta_s$. The driver may therefore get an uncomfortable driving feel. Accordingly, in the present embodiment, the driver is notified of a rapid change in steering characteristics of the rear wheels $12_{RR}$, $12_{RL}$ by a change in steering torque $T_s$. An example of characteristics of the steering torque $T_s$ is as follows.

As shown in graph A of FIG. 5, when the absolute value of the steering angle $\theta_s$ is smaller than the absolute value of the angle thresholds $\theta_{th}$, $-\theta_{th}$, the absolute value of the steering torque $T_s$ gradually increases with an increase in absolute value of the steering angle $\theta_s$. When the absolute value of the steering angle $\theta_s$ is equal to or larger than the absolute value of the angle thresholds $\theta_{th}$, $-\theta_{th}$, the absolute value of the steering torque $T_s$ sharply increases with respect to an increase in absolute value of the steering angle $\theta_s$. That is, the rate (gradient) of increase in absolute value of the steering torque $T_s$ with respect to an increase in absolute value of the steering angel $\theta_s$ is higher (steeper) when the absolute value of the steering angle $\theta_s$ is equal to or larger than the absolute value of the angle thresholds $\theta_{th}$, $-\theta_{th}$ than when the absolute value of the steering angle $\theta_S$ is smaller than the absolute value of the angle thresholds $\theta_{th}$, $-\theta_{th}$.

The characteristics of the steering torque $T_s$ shown by graph A of FIG. 5 are implemented by controlling the target assist torque $T_{as}*$ by the target assist torque calculation circuit 85. A specific example is as follows.

Figure 6:
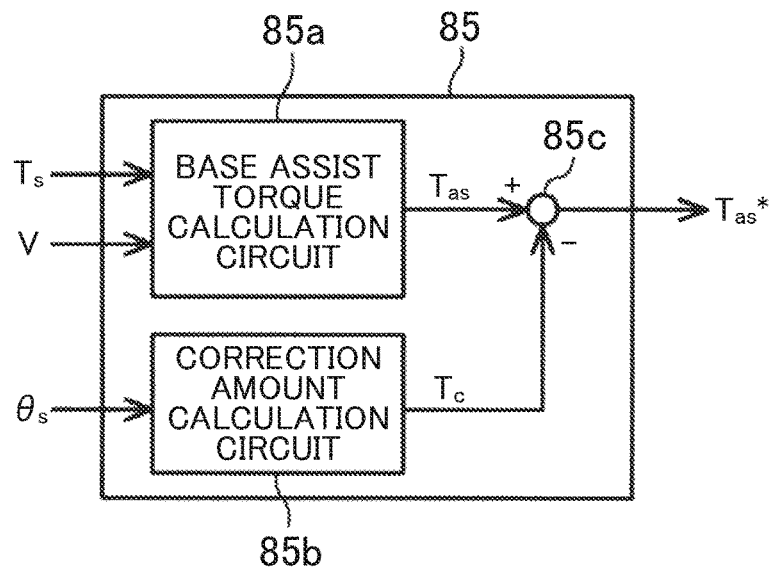
FIG. 6 is a control block diagram of a target assist torque calculation circuit of the first embodiment.

As shown in FIG. 6, the target assist torque calculation circuit 85 has a base assist torque calculation circuit 85a, a correction amount calculation circuit 85b, and a subtractor 85c.

The base assist torque calculation circuit 85a calculates base assist torque $T_{as}$ by using a three-dimensional map that defines the relationship between the steering torque $T_s$ and the base assist torque $T_{as}$ in accordance with the vehicle speed V. The base assist torque calculation circuit 85a sets the absolute value of the base assist torque $T_{as}$ to a larger value as the absolute value of the steering torque $T_s$ increases and the vehicle speed V decreases. The base assist torque $T_{as}$ is a basic component of the target assist torque $T_{as}*$.

The correction amount calculation circuit 85b calculates the amount of correction $T_c$ for the base assist torque $T_{as}$ by using a correction map that defines the relationship between the steering angle $\theta_s$ and the amount of correction $T_c$. The correction map has characteristics in accordance with the characteristics of the steering torque $T_s$ shown in graph A of FIG. 5. When the absolute value of the steering angle $\theta_s$ is equal to or larger than the absolute value of the angle thresholds $\theta_{th}$, $-\theta_{th}$, the absolute value of the amount of correction $T_c$ sharply increases with respect to an increase in absolute value of the steering angle $\theta_s$.

The subtractor 85c calculates the target assist torque $T_{as}*$ by subtracting the amount of correction $T_c$ from the base assist torque $T_{as}$. The target assist torque $T_{as}*$ and thus the steering assist force that is generated by the motor 31 therefore decrease in accordance with the amount of correction $T_c$. Accordingly, when the absolute value of the steering angle $\theta_s$ is equal to or larger than the absolute value of the angle thresholds $\theta_{th}$, $-\theta_{th}$, the absolute value of the steering assist force sharply decreases with respect to an increase in absolute value of the steering angle $\theta_s$, and the absolute value of the steering torque $T_s$ therefore sharply increases with respect to an increase in absolute value of the steering angle $\theta_s$.

When the driver feels such a sharp increase in absolute value of the steering torque $T_s$ he or she can recognize that the steering characteristics of the rear wheels $12_{RR}$, $12_{RL}$ will change rapidly if he or she turns the steering wheel 21 any further in such a direction that the absolute value of the steering angle $\theta_s$ increases, namely can recognize that the turning radius R of the vehicle 10 will sharply decrease with respect to an increase in absolute value of the steering angle $\theta_s$. Accordingly, when, e.g., making a sharp turn, the driver turns the steering wheel 21 after he or she recognizes that the steering characteristics of the rear wheels $12_{RR}$, $12_{RL}$ will change rapidly. This restrains the driver from getting an uncomfortable driving feel or feeling an uncomfortable vehicle behavior.

The first embodiment has the following effects.

(1) While the vehicle 10 is moving in the low speed range, the absolute value of the target steered angle $\theta_{wr}*$ of the rear wheels $12_{RR}$, $12_{RL}$ sharply increases with respect to an increase in absolute value of the steering angle $\theta_s$ when the absolute value of the steering angle $\theta_s$ is equal to or larger than the absolute value of the angle thresholds $\theta_{th}$, $-\theta_{th}$. The vehicle 10 therefore has improved maneuverability with a small turning radius.

(2) When the absolute value of the steering angle $\theta_s$ is equal to or larger than the absolute value of the angle thresholds $\theta_{th}$, $-\theta_{th}$, the absolute value of the steering torque $T_s$ sharply increases with respect to an increase in absolute value of the steering angle $\theta_s$. The driver therefore can feel through the steering wheel 21 a sharp increase in steered angle $\theta_{wr}$ of the rear wheels $12_{RR}$, $12_{RL}$ with respect to an increase in steering angle $\theta_s$. Since the driver can thus be prepared for a sharp decrease in turning radius R of the vehicle 10 with respect to an increase in steering angle $\theta_s$ he or she is less likely to get an uncomfortable driving feel.

(3) The angle thresholds $\theta_{th}$, $-\theta_{th}$ are set to values near the limit steering angles $\theta_{max}$, $-\theta_{max}$ at which the steering wheel 21 reaches the limit position in its physical operation range. When the steering wheel 21 is turned to a position near the limit position in its physical operation range, it is assumed that the driver wants to turn the vehicle 10 with as small a turning radius R as possible. In such a situation, it is preferable to reduce the turning radius R of the vehicle 10 as much as possible.

Next, a second embodiment of the four-wheel steering system will be described. The four-wheel steering system of the present embodiment basically has a configuration similar to that of the first embodiment shown in FIGS. 1 to 3.

Figure 7:
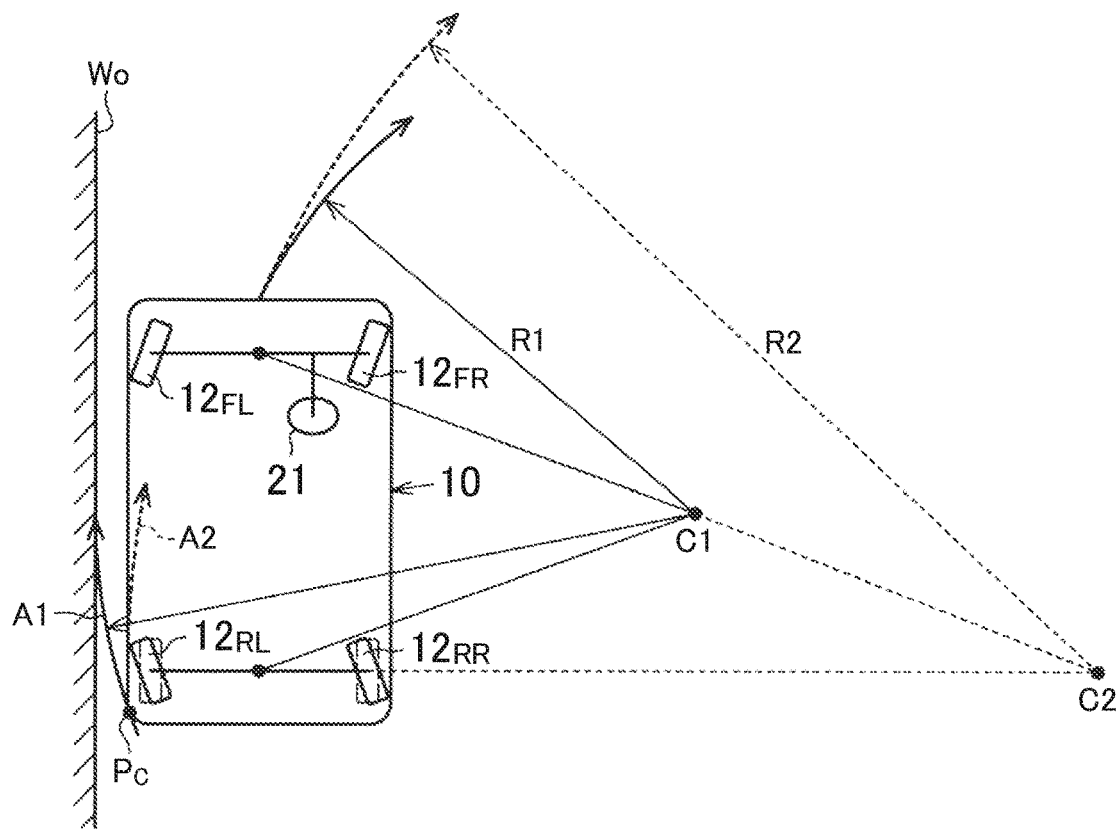
FIG. 7 is a plan view showing turning characteristics of a vehicle in a comparative example.

As shown in FIG. 7, in the case where the vehicle 10 is a four-wheel steering vehicle, the rear wheels $12_{RR}$, $12_{RL}$ are steered in the opposite direction to that in which the front wheels $12_{FR}$, $12_{FL}$ are steered, when the vehicle 10 turns. In this case, the overall turning radius R1 of the vehicle 10 is smaller than the turning radius R2 in the case where the vehicle 10 is a two-wheel steering vehicle. However, the rear part of the vehicle 10 moves more outward of the turn in the early stage of the turn as compared to the case where the vehicle 10 is a two-wheel steering vehicle.

That is, in the case where the vehicle 10 is a two-wheel steering vehicle in which the direction in which the rear wheels $12_{RR}$, $12_{RL}$ are steered is kept in such a direction that the vehicle 10 moves straight, the vehicle 10 turns about the turning center C2 of the two-wheel steering vehicle with a corner Pc of the rear end of the vehicle 10 (e.g., a corner of a rear bumper) moving along a path substantially in the direction in which the rear wheels $12_{RR}$, $12_{RL}$ are steered, as shown by dashed arrow A2 in FIG. 7. The corner Pc of the rear end of the vehicle 10 therefore does not move outward of the turn with respect to an outer side surface of the vehicle 10 which is an outer side surface in the case where the vehicle 10 moves straight.

However, in the case where the vehicle 10 is a four-wheel steering vehicle, the vehicle 10 turns about the turning center C1 of the four-wheel steering vehicle with the corner Pc of the rear end of the vehicle 10 moving along a path substantially in the direction in which the rear wheels $12_{RR}$, $12_{RL}$ are steered, namely in the direction in antiphase with that in which the front wheels $12_{FR}$, $12_{FL}$ are steered, as shown by continuous arrow A1 in FIG. 7. In the early stage of the turn, the corner Pc of the rear end of the vehicle 10 therefore moves outward of the turn with respect to an outer side surface of the vehicle 10 which is an outer side surface in the case where the vehicle 10 moves straight.

Accordingly, when the vehicle 10 parked along an obstacle Wo such as a wall starts to move, the rear part of the vehicle 10 moves outward of a turn in the early stage of the turn. There is therefore a risk that the corner Pc of the rear end of the vehicle 10 may contact the obstacle Wo. The larger the steered angle $\theta_{wr}$ of the rear wheels $12_{RR}$, $12_{RL}$ is, the more this is likely to occur. This is because the larger the steered angle $\theta_{wr}$ of the rear wheels $12_{RR}$, $12_{RL}$ is, the smaller the turning radius of the vehicle 10 is and the more the rear part of the vehicle 10 moves outward of the turn.

The four-wheel steering system of the present embodiment has the following configuration.

Figure 10:
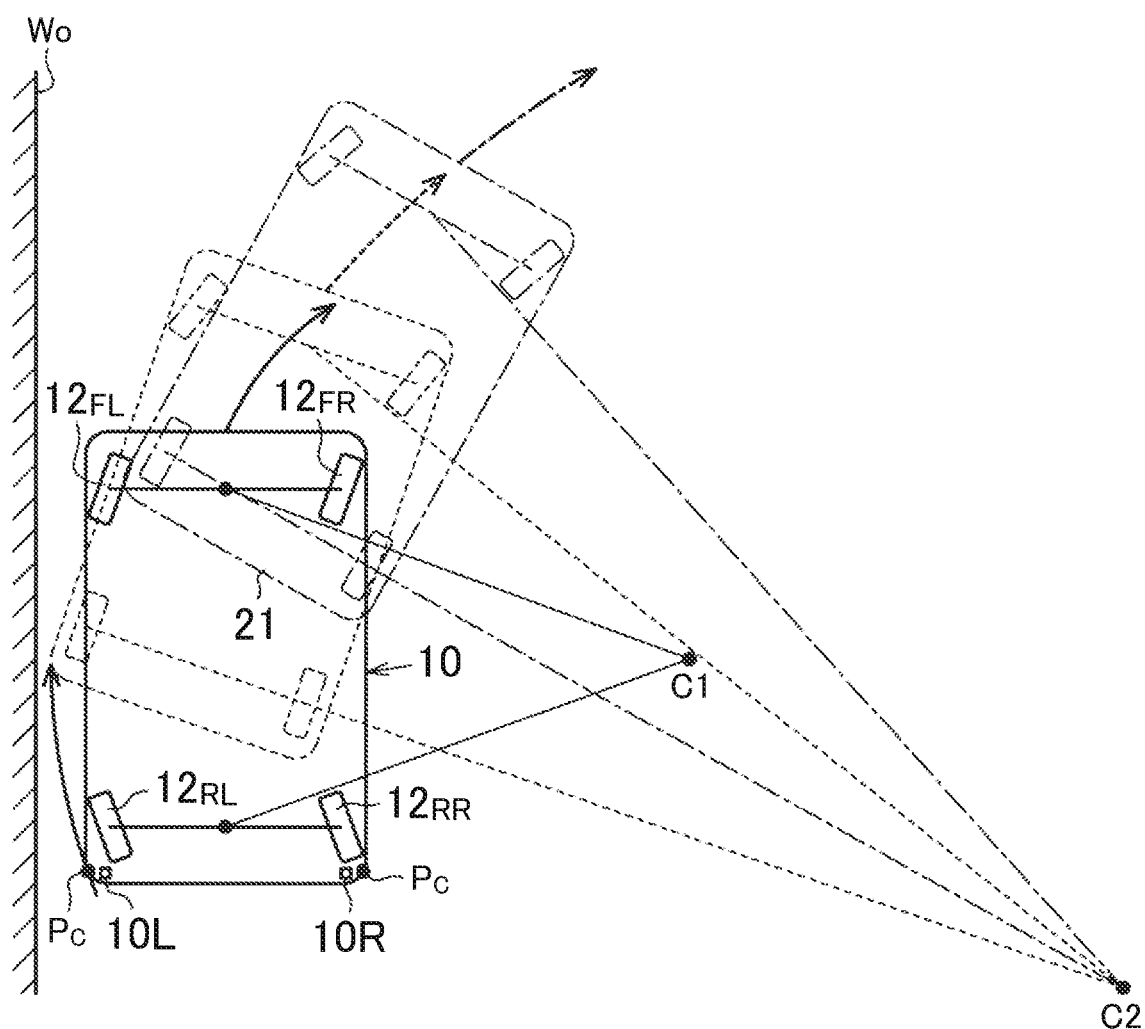
FIG. 10 is a plan view showing turning characteristics of a vehicle in the second embodiment.

As shown in FIG. 10, the vehicle 10 is equipped with obstacle sensors 10R, 10L at two corners Pc, namely right and left corners Pc, of the rear end thereof. The obstacle sensors 10R, 10L detect in a non-contact manner the corners Pc of the vehicle 10 approaching the obstacle Wo such as a wall.

Figure 8:
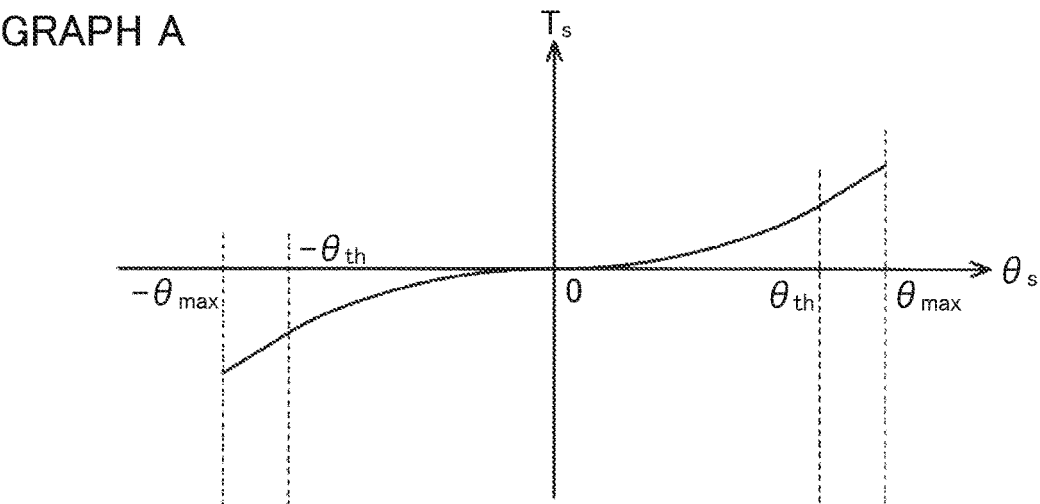
FIG. 8 shows graphs A to C, where graph A shows the relationship between the steering angle and the steering torque in a second embodiment, graph B shows the relationship between the steering angle and the target steered angle of rear wheels in the second embodiment, and graph C shows the relationship between the steering angle and the turning radius of a vehicle in the second embodiment.
Figure 8:
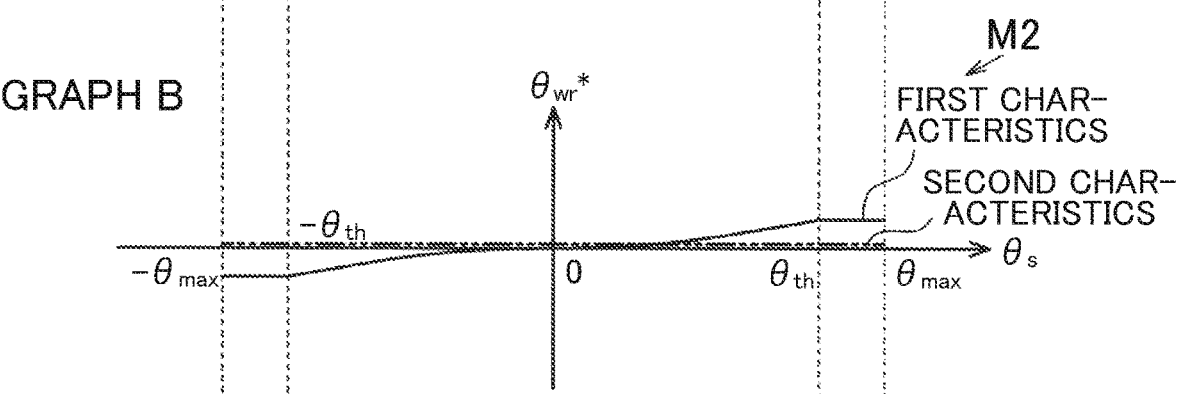
Figure 8:
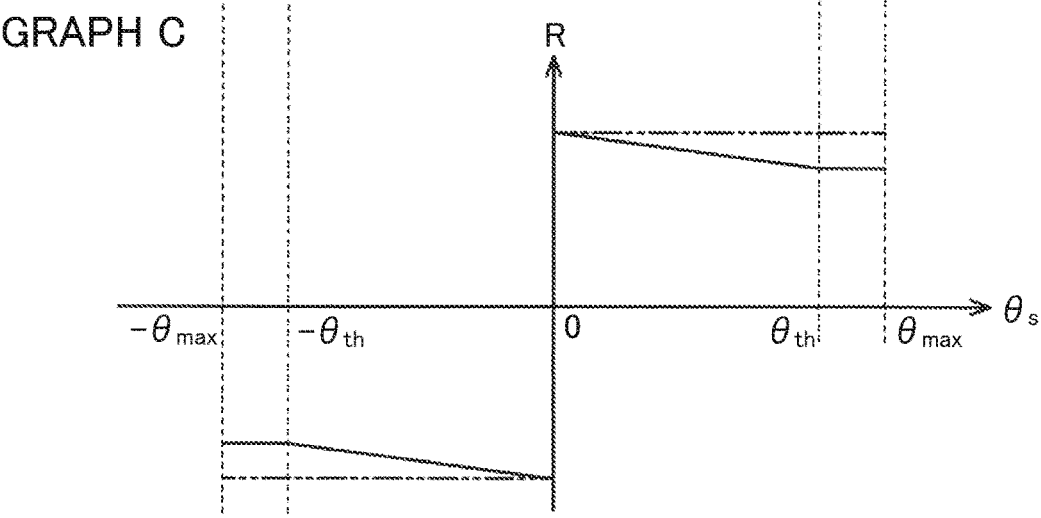

The storage device of the second ECU 71 stores therein a steering characteristics map M2 shown in graph B of FIG. 8 in addition to the steering characteristics map M1. The second ECU 71 switches the steering characteristics map to be used to calculate the target steered angle $\theta_{wr}*$ of the rear wheels $12_{RR}$, $12_m$, between the steering characteristics map M1 and the steering characteristics map M2 based on the detection results of the obstacle sensors 10R, 10L. For example, the steering characteristics map M2 has first characteristics shown by a continuous line in graph B of FIG. 8 or second characteristics shown by a long dashed double-short dashed line in graph B of FIG. 8, in accordance with the product specifications etc.

The first characteristics of the steering characteristics map M2 are as follows.

As shown by the continuous line in graph B of FIG. 8, when the absolute value of the steering angle $\theta_s$ is smaller than the absolute value of the positive and negative angle thresholds $\theta_{th}$, $-\theta_{th}$, the absolute value of the target steered angle $\theta_{wr}*$ gradually increases linearly with an increase in absolute value of the steering angle $\theta_s$. When the absolute value of the steering angle $\theta_s$ is equal to or larger than the absolute value of the positive and negative angle thresholds $\theta_{th}$, $-\theta_{th}$, the absolute value of the target steered angle $\theta_{wr}*$ is kept constant regardless of the absolute value of the steering angle $\theta_s$. The characteristics of the steering characteristics map M2 are different from those of the steering characteristics map M1 in this respect.

By setting the target steered angle $\theta_{wr}*$ of the rear wheels $12_{RR}$, $12_{RL}$ in accordance with the steering characteristics map M2, the turning radius R of the vehicle 10 changes with a change in steering angle $\theta_s$ in the following manner.

As shown by continuous lines in graph C of FIG. 8, when the absolute value of the steering angle $\theta_s$ is smaller than the absolute value of the angle thresholds $\theta_{th}$-$\theta_{th}$, the absolute value of the turning radius R gradually decreases with an increase in absolute value of the steering angle $\theta_s$. When the absolute value of the steering angle $\theta_s$ is equal to or larger than the absolute value of the angle thresholds $\theta_{th}$, $-\theta_{th}$, the absolute value of the turning radius R is kept constant regardless of the steering angle $\theta_s$. Unlike in the steering characteristics map M1, when the absolute value of the steering angle $\theta_s$ is equal to or larger than the absolute value of the angle thresholds $\theta_{th}$, $-\theta_{th}$, the absolute value of the turning radius R does not rapidly decrease with respect to an increase in absolute value of the steering angle $\theta_s$.

As described above, in the case where the target steered angle $\theta_{wr}*$ of the rear wheels $12_{RR}$, $12_{RL}$ is calculated by using the steering characteristics map M2, the steering characteristics of the rear wheels $12_{RR}$, $12_{RL}$ do not rapidly change. It is therefore not necessary to rapidly change the steering torque $T_s$ in order to notify the driver of a rapid change in steering characteristics. Accordingly, the steering torque $T_s$ is controlled in the following manner in the case where the target steered angle $\theta_{wr}*$ of the rear wheels $12_{RR}$, $12_{RL}$ is calculated by using the steering characteristics map M2.

As shown in graph A of FIG. 8, the absolute value of the steering torque $T_s$ gradually increases linearly with an increase in absolute value of the steering angle $\theta_s$ in the entire operation range of the steering wheel 21 ($0 \leq |\theta_s| \leq |\pm\theta_{max}|$).

The second characteristics of the steering characteristics map M2 are as follows.

As shown by the long dashed double-short dashed line in graph B of FIG. 8, the absolute value of the target steered angle $\theta_{wr}^*$ is kept at 0 (zero) regardless of the value of the steering angle $\theta_s$. In the case where the steering characteristics map M2 with the second characteristics is used, the rear wheels $12_{RR}$, $12_{RL}$ are kept at a steering neutral position, namely the position corresponding to the state where the vehicle 10 is moving straight, regardless of the steering angle $\theta_s$, as in the case of a normal two-wheel steering vehicle. In the case where the steering characteristics map M2 with the second characteristics is used, the turning radius R of the vehicle 10 is kept constant in accordance with the steered angle $\theta_{wf}$ of the front wheels $12_{FR}$, $12_{FL}$, as shown by long dashed double-short dashed lines in graph C of FIG. 8. The steering torque $T_s$ is controlled in a manner similar to that of the steering characteristics map M2 with the first characteristics shown in graph A of FIG. 8.

A process of switching steering control of the rear wheels $12_{RR}$, $12_{RL}$ by the second ECU 71 will be described. It is herein assumed that the vehicle speed V is in the low speed range lower than the vehicle speed threshold (e.g., 30 km/h).

Figure 9:
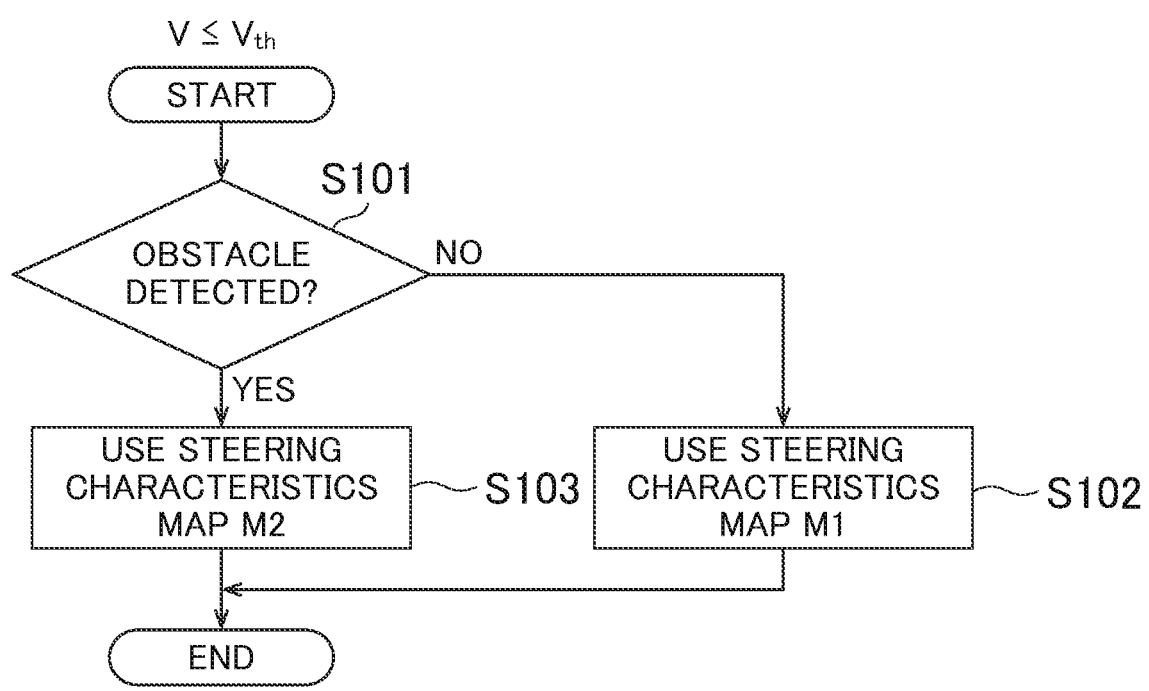
FIG. 9 is a flowchart of a process of switching steering control of the rear wheels in the second embodiment.

As shown by the flowchart of FIG. 9, the second ECU 71 determines if any obstacle Wo has been detected by at least one of the obstacle sensors 10R, 10L (step S101). If it is determined that no obstacle Wo has been detected by at least one of the obstacle sensors 10R, 10L (NO in step S101), the second ECU 71 performs steering control of the rear wheels $12_{RR}$, $12_{RL}$ by using the steering characteristics map M1 (step S102). If it is determined that an obstacle Wo has been detected by at least one of the obstacle sensors 10R, 10L (YES in step S101), the second ECU 71 performs steering control of the rear wheels $12_{RR}$, $12_{RL}$ by using the steering characteristics map M2 (step S102).

The second embodiment has the following functions and effects.

It is herein assumed that the vehicle 10 parked along an obstacle Wo such as a wall starts to move with the rear wheels $12_{RR}$, $12_{RL}$ steered in antiphase with the front wheels $12_{FR}$, $12_{FL}$ as shown by continuous lines in FIG. 10. In this case, as shown by dashed lines in FIG. 10, the corner Pc (in this example, the left corner Pc) of the rear part of the vehicle 10 approaches the obstacle Wo as the vehicle 10 turns. When at least one of the obstacle sensors 10R, 10L detects the corner Pc approaching the obstacle Wo, the steering control of the rear wheels $12_{RR}$, $12_{RL}$ is switched from the steering control using the steering characteristics map M1 to the steering control using the steering characteristics map M2.

In the case where the steering characteristics map M2 has the second characteristics (the steered angle $\theta_{wr}$ of the rear wheels $12_{RR}$, $12_{RL}$ is always set to 0), the rear wheels $12_{RR}$, $12_{RL}$ are turned to the steering neutral position. As a result, the turning center of the vehicle 10 moves from the turning center C1 for four-wheel steering to the turning center C2 for two-wheel steering. Thereafter, as shown by long dashed short dashed lines in FIG. 10, the corner Pc of the rear part of the vehicle 10 does not move outward of the turn anymore and the vehicle 10 can turn so as to move away from the obstacle Wo as a normal two-wheel steering vehicle does. The corner Pc of the rear part of the vehicle 10 is thus restrained from contacting the obstacle Wo.

In the case where the steering characteristics map M2 has the first characteristics, namely in the case where the absolute value of the target steered angle $\theta_{wr}^*$ of the rear wheels $12_{RR}$, $12_{RL}$ gradually increases with respect to an increase in absolute value of the steering angle $\theta_s$, the absolute value of the steered angle $\theta_{wr}$ of the rear wheels $12_{RR}$, $12_{RL}$ does not sharply increase with respect to an increase in absolute value of the steering angle $\theta_s$ even when the absolute value of the steering angle $\theta_s$ is equal to or larger than the absolute value of the angle thresholds $\theta_{th}$, $-\theta_{th}$. The corner Pc of the rear part of the vehicle 10 is thus restrained from contacting the obstacle Wo.

The first and second embodiments may be modified as follows.

In the first and second embodiments, the first ECU 41 and the second ECU 71 detect the steering angle $\theta_s$ via the steering angle sensor 44. However, the steering angle $\theta_s$ may be calculated based on the rotation angle $\theta_{mf}$ of the motor 31 which is detected by the rotation angle sensor 45. The motor 31 is coupled to the steering shaft 22 via the reduction gear mechanism 32, the pinion shaft 33, and the steered shaft 23. Accordingly, there is a correlation between the rotation angle $\theta_{mf}$ of the motor 31 and the steering angle $\theta_s$. The steering angle $\theta_s$ can therefore be calculated from the rotation angle $\theta_{mf}$ of the motor 31. With this configuration, the invention can also be suitably applied to a vehicle 10 that is not equipped with the steering angle sensor 44, depending on the specifications of the vehicle 10 etc.

In the first and second embodiments, the front-wheel steering system 13 is configured to apply torque of the motor 31 to the steered shaft 23. However, for example, the front-wheel steering system 13 may be configured to apply torque of the motor 31 to the steering shaft 22 (the column shaft 25).

In the first embodiment, the front-wheel steering system 13 is configured to assist in steering by applying torque of the motor 31 to the steered shaft 23. However, the configuration that assists in steering may be omitted depending on the specifications of the vehicle 10 etc. In this case, the front wheels $12_{FR}$, $12_{FL}$ are steered only by the driver's steering operation.

In the second embodiment, in the case where at least one of the obstacle sensors 10R, 10L detects the corner Pc of the rear part of the vehicle 10 approaching an obstacle Wo, the rear wheels $12_{RR}$, $12_{RL}$ may be steered in the same direction as that in which the front wheels $12_{FR}$, $12_{FL}$ are steered when the absolute value of the steering angle $\theta_s$ is equal to or larger than the absolute value of the angle thresholds $\theta_{th}$, $-\theta_{th}$. This allows the vehicle 10 to move parallel to the direction in which the front wheels $12_{FR}$, $12_{FL}$ and the rear wheels $12_{RR}$, $12_{RL}$ are steered so as to move away from the obstacle Wo, although it depends on the steered angle $\theta_{wr}$ of the rear wheels $12_{RR}$, $12_{RL}$. The corner Pc of the rear part of the vehicle 10 is thus restrained from contacting the obstacle Wo.

In the first and second embodiments, the relationship between the steering angle $\theta_s$ and the rotation radius (turning radius R) of the vehicle may be defined so that, when the absolute value of the steering angle $\theta_s$ is in the range from zero to the absolute value of the angle thresholds $\theta_{th}$, $-\theta_{th}$, the rotation radius of the vehicle is in a commonly used range that is required for normal steering operation, and when the absolute value of the steering angle $\theta_s$ is in the range larger than the absolute value of the angle thresholds $\theta_{th}$-$\theta_{th}$, the rotation radius of the vehicle is in a non-commonly used range that is not required for normal steering operation. In this case, when the absolute value of the steering angle $\theta_s$ is in the range from zero to the absolute value of the angle thresholds $\theta_{th}$, $-\theta_{th}$ which is the switch point of the steering characteristics, control is performed mainly so as to provide the driver and occupants with a natural feel (driving feel, riding feel, etc.). When the absolute value of the steering angle $\theta_s$ is in the range larger than the absolute value of the angle thresholds $\theta_{th}$, $-\theta_{th}$, control is performed mainly so as to provide good maneuverability with a small turning radius. However, since this range corresponds to the non-commonly used range, the impact of such control on the driver or occupants is not significant.

What is claimed is:

1. A four-wheel steering system, comprising:
  a front-wheel steering system that steers front wheels of a vehicle; and
  a rear-wheel steering system that steers rear wheels of the vehicle in accordance with a steering angle that is a rotation angle of a steering wheel, wherein,
  when a vehicle speed is lower than a vehicle speed threshold, the rear-wheel steering system steers the rear wheels in an opposite direction to that in which the front wheels are steered along a whole range of the steering angle, and
  when the vehicle speed is lower than the vehicle speed threshold, the rear-wheel steering system sharply increases a rate of increase in a steered angle of the rear wheels with respect to an increase in the steering angle when an absolute value of the steering angle is equal to or larger than an absolute value of an angle threshold.

2. The four-wheel steering system according to claim 1, wherein,
  the front-wheel steering system has a motor that is a source of a steering assist force and a control device that controls the motor in accordance with a steering state, and
  when the vehicle speed is lower than the vehicle speed threshold, the control device controls the motor so as to sharply increase a rate of increase in a steering torque with respect to an increase in the steering angle when the absolute value of the steering angle is equal to or larger than the absolute value of the angle threshold, the steering torque being applied to the steering wheel by the driver.

3. The four-wheel steering system according to claim 1, wherein,
  when an obstacle sensor mounted on a rear part of the vehicle detects a corner of the rear part of the vehicle approaching an obstacle, the rear-wheel steering system does not perform such control that sharply increases the rate of increase in the steered angle of the rear wheels with respect to an increase in the steering angle even when the absolute value of the steering angle is equal to or larger than the absolute value of the angle threshold.

4. The four-wheel steering system according to claim 1, wherein,
  the angle threshold is set to a value near a limit steering angle at which the steering wheel reaches a limit position in a physical operation range of the steering wheel.

5. A four-wheel steering system, comprising:
  a front-wheel steering system that steers front wheels of a vehicle; and
  a rear-wheel steering system that steers rear wheels of the vehicle in accordance with a steering angle that is a rotation angle of a steering wheel, wherein,
  when a vehicle speed is lower than a vehicle speed threshold, the rear-wheel steering system steers the rear wheels in an opposite direction to that in which the front wheels are steered, and
  when an obstacle sensor mounted on a rear part of the vehicle detects a corner of the rear part of the vehicle approaching an obstacle, the rear-wheel steering system either returns the rear wheels to a steering neutral position corresponding to a state where the vehicle is moving straight or steers the rear wheels in the same direction as that in which the front wheels are steered, when an absolute value of the steering angle is equal to or larger than an absolute value of an angle threshold.

* * * * *